(12) United States Patent
Shimizu

(10) Patent No.: US 6,588,893 B2
(45) Date of Patent: Jul. 8, 2003

(54) SPECTACLE HAVING NO EYEWIRE ON RIM LENS

(75) Inventor: Yasunobu Shimizu, Higashiosaka (JP)

(73) Assignee: Kabushiki Kaisha Shimizu Megane (JP)

( * ) Notice: Subject to any disclaimer, the term of this patent is extended or adjusted under 35 U.S.C. 154(b) by 0 days.

(21) Appl. No.: 10/135,079

(22) Filed: Apr. 29, 2002

(65) Prior Publication Data

US 2002/0163618 A1 Nov. 7, 2002

(30) Foreign Application Priority Data

May 1, 2001 (JP) .......................... 2001-133974

(51) Int. Cl.⁷ .................................. G02C 1/02
(52) U.S. Cl. ........................ 351/110; 351/124
(58) Field of Search ................... 351/110, 124, 351/41

(56) References Cited

U.S. PATENT DOCUMENTS 6,170,951 B1 * 1/2001 Tabacchi .................... 351/110

FOREIGN PATENT DOCUMENTS

| DE | 299 01 347 U1 | 1/2000 |
| WO | WO 96/33438 | 10/1996 |
| WO | WO 97/21133 | 6/1997 |

* cited by examiner

Primary Examiner—Hung Xuan Dang
(74) Attorney, Agent, or Firm—Gerald E. Hespos; Anthony J. Casella

(57) ABSTRACT

A pair of glasses is provided with an attachment mechanism including a mount groove formed in an end portion of the glass, a lower portion of the mount groove being defined by a converging wall, a mount element provided at an end of the frame member, a fastening device which fastens the frame member on the glass by way of the mount element, and a retaining projection formed on the frame member near the mount element. The retaining projection has a leading end which comes into contact with the converging wall of the mount groove at least two or more points when the frame member is fastened on the glass by the fastening device.

13 Claims, 6 Drawing Sheets

SPECTACLE HAVING NO EYEWIRE ON RIM LENS

BACKGROUND OF THE INVENTION

This invention relates to spectacles or glasses which are provided with no eyewire on rims of lenses of glasses. Such glasses are referred to as "eyewireless glasses" hereinafter.

DESCRIPTION OF THE RELATED ART

Heretofore, generally, eyewireless glasses as shown in FIG. 6A are known. Eyewireless glasses 100 comprise, as shown in FIG. 6A, a pair of lenses 101, 101, a bridge 102 which is provided to attach the lenses 101, 101, and a pair of temples 103, 103 provided in correspondence to the lens 101, 101. Attachment mechanisms 110 which respectively attach the lens 101 (101) and the bridge 102, and the lens 101 (101) and the temple 103 (103) are provided.

FIG. 6B is an enlarged cross-sectional view taken along the line 6B—6B in FIG. 6A, showing the conventional attachment mechanism 110. As shown in FIG. 6B, the attachment mechanism 110 includes a mount groove 111 formed in a side end portion of the lens 101 which extends in a width direction of the lens 101 (direction perpendicularly intersecting the plane of FIG. 6B), a first through hole 112 formed in a base end of the mount groove 111 (rear direction of the plane in FIG. 6B), an projection 113 formed at a base end of the temple 103, which is engageably fitted in the mount groove 111, a mount element 115 formed with a second through hole 114 in correspondence to the first through hole 112, a fastening screw 116 which is screwed into the first through hole 112 and the second through hole 114 to attach the lens 101 and the temple 103, and a nut 117 which fastens the screw 116.

The mount groove 111 has a rectangular shape in section. The projection 113 has a rectangular shape in section and has such dimensions as to be slidably fitted in the mounting grove 111. With this arrangement, inserting the screw 116 in the second through hole 114 of the mount element 115 and in the first through hole 112 of the lens 101 and fastening with the nut 117 in a state that the projection 113 is engageably fitted in the mount groove 111 enables to directly attach the temple 103 to the lens 101.

It should be appreciated that a description of the attachment mechanism for attaching the bridge 102 and the lens 101 (101) is omitted in this section of prior art since the attachment mechanism for attaching the bridge 102 and the lens 101 (101) is the same as the attachment mechanism for attaching the lens 101 and the temple 103.

In the attachment mechanism 110 having the above construction, the mount groove 111 of the lens 101 is formed by a cutting tool such as a file. Likewise, the projection 113 is formed at the temple 103 by a cutting tool such as a file. Since it is a general matter that a machining precision by such a cutting tool varies from piece to piece, a clearance d is inevitably formed between the projection 113 and a side and/or bottom wall of the mount groove 111 when the projection 113 is fitted in the mount groove 111, as shown in FIG. 6B.

When the clearance d is formed, the bridge 102 and the temple 103 are likely to swing relative to the lens 101 clockwise or counterclockwise about an axis of the fastening screw 116, which may cause undesirable displacement of the bridge 102 and the temple 103 relative to the lens 101.

Further, as shown in FIG. 6B, generally, a right end portion of the projection 113 on the plane of FIG. 6B is not necessarily brought in plane contact with the bottom wall of the mount groove 111 but may be brought in one side contact therewith. When the right end of the projection 113 is rendered in contact with the bottom wall of the mount groove 111, the projection 113 is also allowed to swing about an axis of the contact point, which may cause undesirable displacement of the bridge 102 and the temple 103 relative to the lens 101.

Even if the clearance d between the projection 113 and the bottom wall of the mount groove 111 is as small as, for example, 10 μm, a displacement within such a small clearance causes a large swing of the temple 103 at a distal end thereof since the displacement corresponds to a proportion of the length of the temple 103 against the depth of the mount groove 111 as the displacement is propagated toward the distal end of the temple 103. For example, when the clearance d is 10 μm (0.01 mm), the depth of the mount groove 111 is 1.0 mm, and the length of the temple 103 is 140 mm, the distal end of the temple 103 swings at an amplitude corresponding to 1.4 mm (=0.01 mm (10 μm) ×(140 mm/1.0 mm)). Thus, the distal end of the temple 103 may swing at an amplitude as large the amount corresponding to 2.8 mm.

The swing amount is negligible as far as the glasses 100 are worn. However, when the wearer slightly moves the left and right temples 103 toward and away from each other about an axis of a pivotal point of the corresponding fastening screw 116 when the wearer is about to take off or wear the glasses 100, the temples 103 are likely to be greatly moved toward and away from each other at their distal ends. The glasses having likelihood of causing such an undesired displacement fail to provide high-grade quality, which may lower their commercial value.

The same problem is also involved in a displacement at a connection portion between the lens 101 (101) and the bridge 102.

SUMMARY OF THE INVENTION

It is an object of the present invention to provide a eyewireless spectacles or glasses which are free from the problems residing in the prior art.

It is another object of the present invention to provide eyewireless spectacles or glasses which enable to securely attach a frame member to a lens and suppress an undesirable displacement at a connection portion between the frame member and the lens.

According to an aspect of the invention, a pair of glasses is provided with a frame member which support a glass, and an attachment mechanism. The attachment mechanism includes: a mount groove formed in an end portion of the glass, a lower portion of the mount groove being defined by a converging wall; a mount element provided at an end of the frame member; a fastening device which fastens the frame member on the glass by way of the mount element; and a retaining projection formed on the frame member near the mount element. The retaining projection has a leading end which comes into contact with the converging wall of the mount groove at least two or more points when the frame member is fastened on the glass by the fastening device.

These and other objects, features and advantages of the present invention will become more apparent upon a reading of the following detailed description and accompanying drawing.

BRIEF DESCRIPTION OF THE DRAWINGS

FIGS. 3A and 3B are partially enlarged perspective views of the glasses illustrating an attachment mechanism which attaches a bridge to a lens, in which FIG. 3A shows a state immediately before the bridge is attached to the lens, and FIG. 3B shows a state that the bridge is attached to the lens;

FIGS. 4A and 4B are partially enlarged perspective views of the glasses illustrating an attachment mechanism which attaches a temple to the lens, in which FIG. 4A shows a state immediately before the temple is attached to the lens and FIG. 4B shows a state that the temple is attached to the lens;

FIGS. 5A through 5C are diagrams showing an attachment mechanism used in the embodiment, in which FIG. 5A is a plan view in section, FIG. 5B is a front view, and FIG. 5C is a side view in section; and FIGS. 6A and 6B are diagrams showing conventional eyewireless glasses, in which FIG. 6A is a perspective view showing an entire appearance of the conventional glasses, and FIG. 6B is an enlarged sectional view taken along the line 6B—6B in FIG. 6A.

DETAILED DESCRIPTION OF THE PREFERRED EMBODIMENTS OF THE INVENTION

Figure 1:
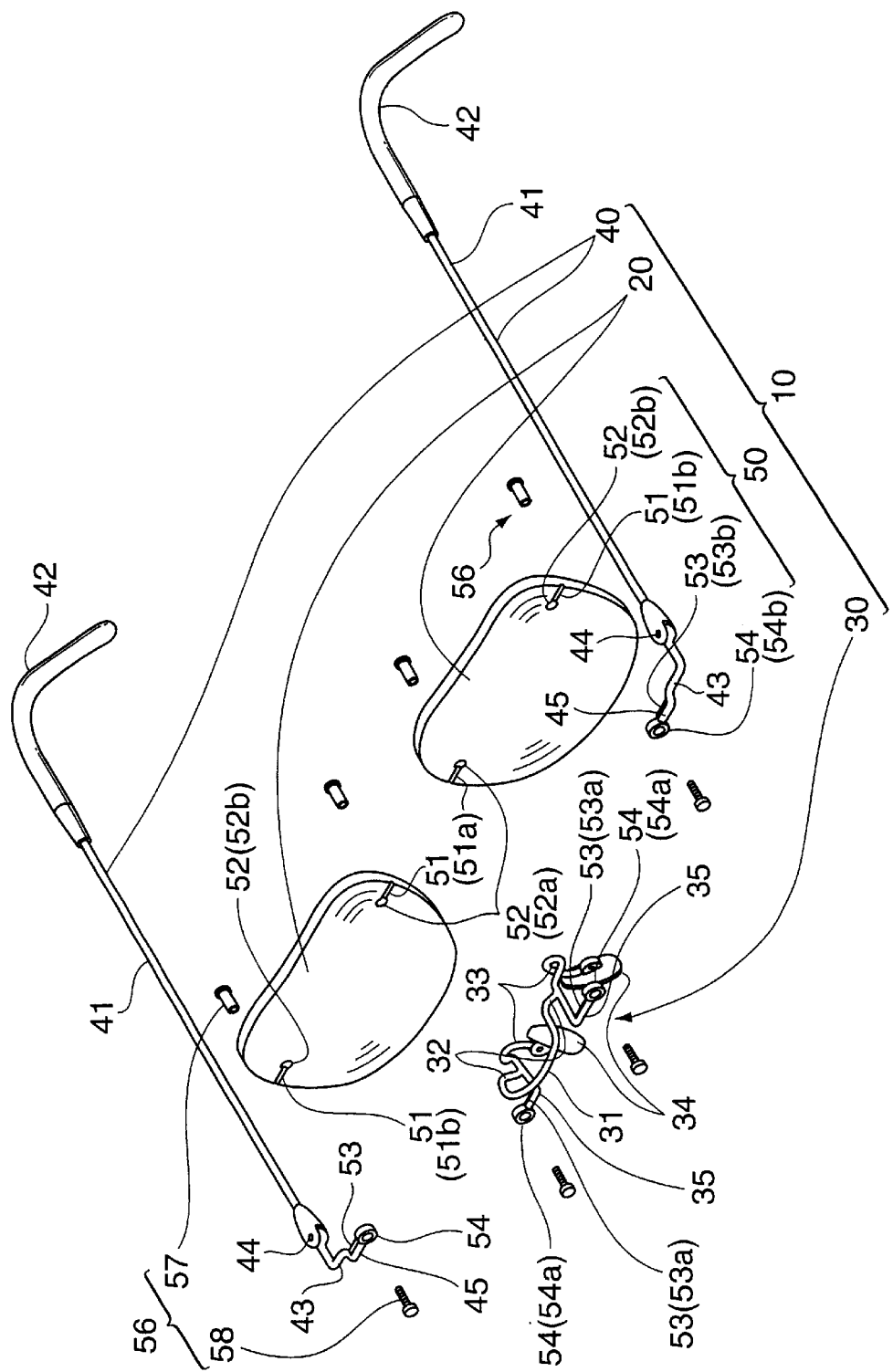
FIG. 1 is an exploded perspective view of eyewireless glasses according to an embodiment of the present invention.
Figure 2:
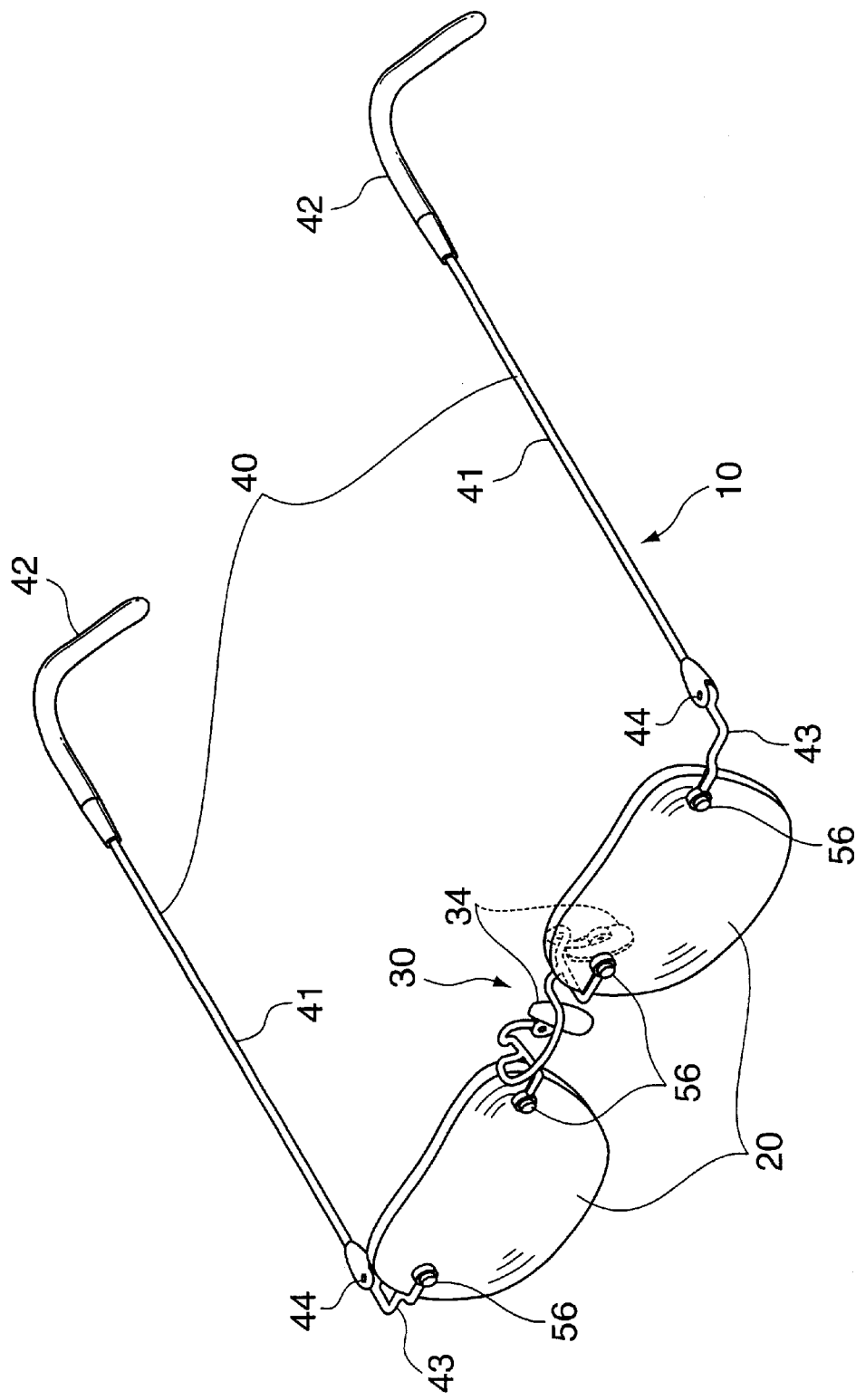
FIG. 2 is a perspective view of the glasses in an assembled state.

Referring to FIGS. 1 and 2 showing eyewireless glasses embodying the invention, eyewireless glasses 10 comprise a pair of left and right glasses 20, 20, a bridge 30 which is mounted between the glasses 20, 20, a pair of left and right temples 40, 40 which are respectively mounted at side end portions of the left and right lenses 20, 20, attachment mechanisms 50 which are respectively provided between the lens 20 (20) and the bridge 30, and between the lens 20 (20) and the temple 103 (103). The temples 40, 40 and the bridge 30 are frame members for supporting the pair of glasses 20 and 20.

The attachment mechanism 50 for attaching the lens 20 (20) and the bridge 30 is referred to as a bridge-attachment mechanism 50, and the attachment mechanism 50 for attaching the lens 20 (20) and the temple 40 (40) is referred to as a temple-attachment mechanism 50.

The lens 20 is not provided with an eyewire around a rim thereof, and is directly attached to the bridge 30 and the temple 40 via the corresponding attachment mechanism 50. The lens 20 is formed with a mount groove 51 and a first through hole 52 which are constituent elements of the attachment mechanism 50. The mount groove 51 is formed in each of left and right end portions on the frontal surface of the lens 20 with certain dimensions (in the embodiment, the groove 51 has a depth of about 1 mm, a width of about 1 mm, and a length of about 5 mm). The grooves 51 extend toward each other from right and left ends of the lens 20. The first through hole 52 is formed in a base end of the mount groove 51 (inner side of the lens 20). In this embodiment, the first through hole 52 has a diameter of about 2 mm.

The mount groove 51 of the bridge-attachment mechanism 50 is referred to as a mount groove 51a for attaching the bridge 30 and the lens 20. The mount groove 51 of the temple-attachment mechanism 50 is referred to as a mount groove 51b for attaching the lens 20 and the temple 40. Likewise, the first through hole 52 of the bridge-attachment mechanism 50 is referred to as a first through hole 52a, and the first through hole 52 of the temple-attachment mechanism 50 is referred to as a first through hole 52b.

The bridge 30 includes a main body 31 having a U-shape in plan view, a pair of left and right suspending portions 32, 32 respectively extending downward from the opposite ends of the main body 31, a pair of pad support portions 33, 33 each of which extends rearward (in a direction toward the lens 20 on the plane of FIG. 1) from a lower end of the corresponding suspending portion 32 (32) by a certain length and is bent downward, a pair of nose pads 34, 34 which are respectively attached to the support portions 33, 33 opposingly at lower ends thereof for supporting the glasses in fitting contact with the nose of the wearer, and bridge attachment portions 35, 35 which respectively extend forward from the lower ends of the suspending portions 32, 32 and are bent in such directions as to be away from each other.

Figure 3A:
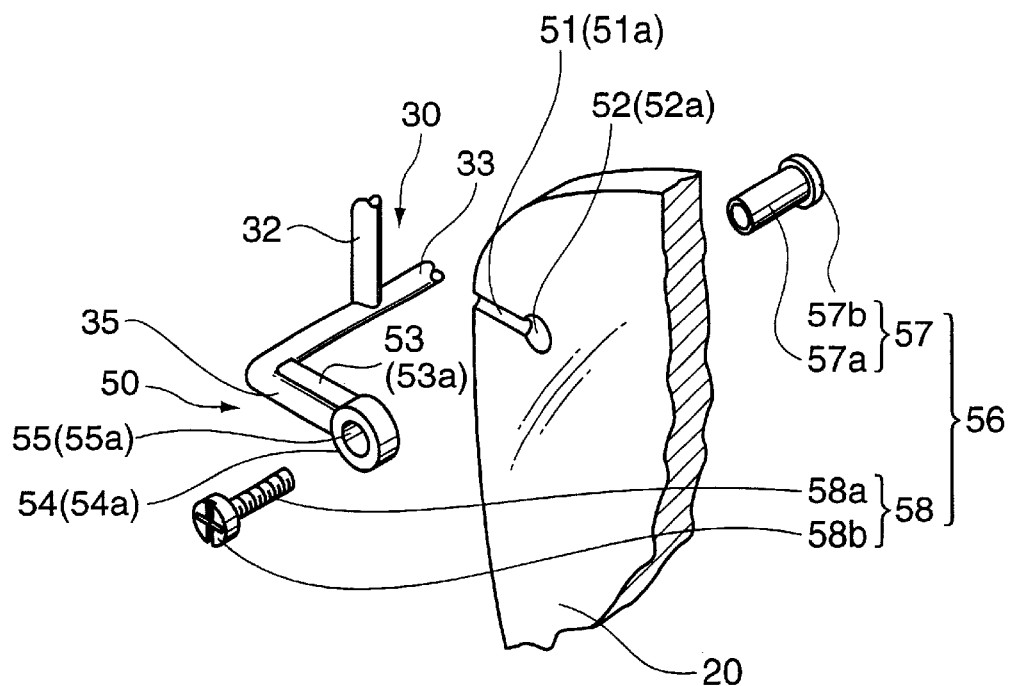
Figure 3B:
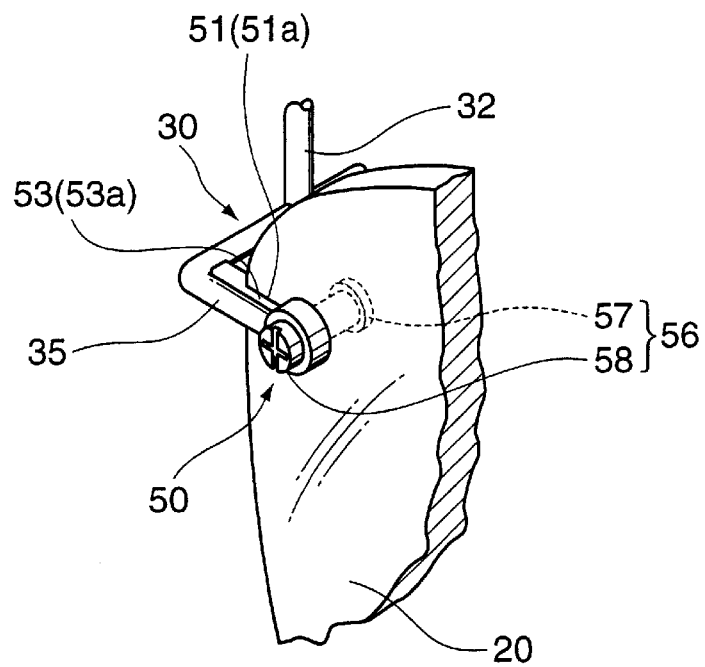

The bridge attachment portion 35 is adapted to attach the bridge 30 to the corresponding lens 20. FIGS. 3A and 3B are partially enlarged views of the bridge-attachment mechanism 50 for attaching the bridge 30 and the lens 20. FIG. 3A shows a state immediately before the bridge 30 is attached to the lens 20, and FIG. 3B shows a state that the bridge 30 is attached to the lens 20.

The bridge attachment portion 35 includes, as shown in FIG. 3B, an retaining projection 53 (bridge-side retaining projection 53a) which projects outwardly in parallel to the lens surface (see FIG. 3B) and extends in an axial direction thereof, and a mount element 54 (bridge-side mount element 54a) attached to a lead end of the retaining projection 53.

The bridge-side retaining projection 53a is one of the constituent elements of the bridge-attachment mechanism 50, and has such dimensions that a thickness thereof is slightly smaller than the width of the mount groove 51a and a length thereof is slightly longer than the length of the mount groove 51a. With this arrangement, the bridge-side retaining projection 53a is securely fitted in the mount groove 51a.

The bridge-side mount element 54a is also one of the constituent elements of the bridge-attachment mechanism 50. The mount element 54a has a circular shape with an outer diameter thereof slightly larger than an inner diameter of the corresponding first through hole 52a and is formed with a second through hole 55 (bridge-side second through hole 55a) at a center thereof which has substantially the same inner diameter as the first through hole 52a.

With this arrangement, fittingly inserting the bridge-side retaining projection 53a into the mount groove 51a and fastening with a fastening device 56 which is described later in the state shown in FIG. 3A securely attaches the bridge 30 to the lens 20, as shown in FIG. 3B.

More specifically, the fastening device 56 is one of the constituent elements of the attachment mechanism 50. In this embodiment, the fastening device 56 includes a nut 57, and a screw 58 which is screwed into the nut 57. The nut 57 includes a cylindrical portion 57a having a length slightly shorter than a length corresponding to the sum of the thickness of the lens 20 and the thickness of the mount element 54a, and a head portion 57b formed at one end of the cylindrical portion 57a. The cylindrical portion 57a has such an outer diameter thereof as to be slidably inserted into the first through hole 52a.

The screw 58 includes a main body 58a and a head portion 58b formed at one end of the main body 58a. The main body 58a is formed with a male threaded portion in an outer circumference thereof so as to match a female threaded portion formed inside the nut 57.

With this arrangement, fittingly inserting the retaining projection 53a in the mount groove 51a, inserting the cylindrical portion 57a of the nut 57 into the first through hole 52a of the lens 20 from backside of the lens 20 and in the second through hole 55a of the mount element 54a, and fastening the main body 58a of the screw 58 into the threaded hole of the cylindrical portion 57a of the nut 57 in a state that the mount element 54a is placed over the frontal surface of the lens 20 enables to securely attach the bridge 30 to the lens 20, as shown in FIG. 3B.

The cylindrical portion 57a of the nut member 57 has a smooth outer circumference to be slidably fitted into the first through hole 52a and the second through hole 55a. This arrangement enables to provide a more stable fitting state with less likelihood of causing shake, compared to a case where an outer circumference of a screw formed with a spiral groove is brought into contact with an inner circumference of the first and second through holes 52, 55. Thereby, an undesirable displacement at an attachment portion between the lens 20 and the bridge 30 can be securely prevented.

The temple 40 includes, as shown in FIGS. 1 and 2, a main body 41 of a straight wire-like shape having flexibility, an ear piece 42 extending downward from a rear end of the main body 41 with a certain curvature, and an end piece 43 connected to a frontal end of the main body 41.

The end piece 43 is adapted to connect the temple 40 to the lens 20. The end piece 43 is bent at a substantially right angle with a base end thereof connected to the frontal end of the main body 41 to be rotatable about an axis of a coupler shaft 44 in a predetermined range via a hinge mechanism. With this arrangement, a pair of temples 40, 40 are selectively settable to a housed posture where the temples 40, 40 are folded generally in parallel to the lens 20 and an opened posture where the temples 40, 40 are opened to the lens 20 generally at a right angle.

The lead end of the end piece 43 is formed with an attachment portion 45 for attaching the temple 40 to the lens 20.

Figure 4A:
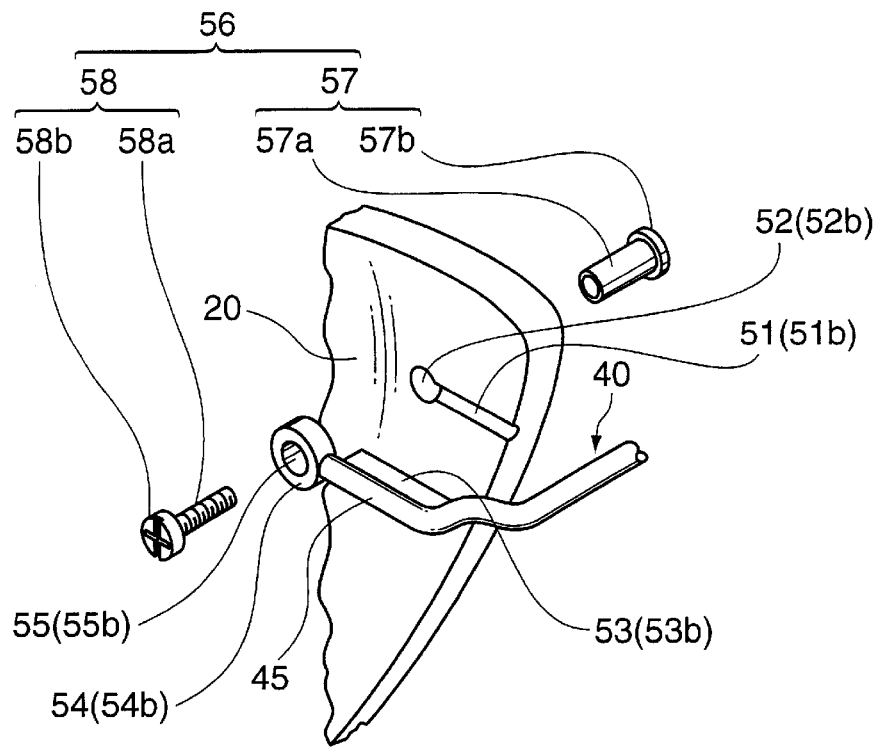
Figure 4B:
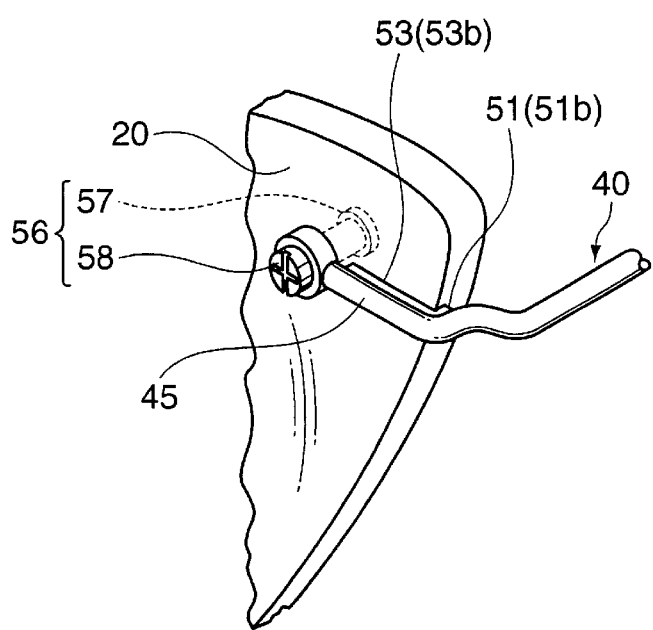

FIGS. 4A and 4B are partially enlarged views illustrating the temple-attachment mechanism 50 for attaching the temple 40 to the lens 20. FIG. 4A shows a state immediately before the temple 40 is attached to the lens 20, and FIG. 4B shows a state that the temple 40 is attached to the lens 20. It should be noted that the same elements in the temple-attachment mechanism as those in the bridge-attachment mechanism are denoted at the same reference numerals.

The attachment portion 45 includes, as shown in FIG. 4B, an retaining projection 53 (temple-side retaining projection 53b) extending inwardly in parallel to the surface of the lens 20 (leftward on the plane of FIG. 4A), and a mount element 54 (temple-side mount element 54b) attached to a lead end of the temple-side retaining projection 53b.

The temple-side retaining projection 53b is one of the constituent elements of the temple-attachment mechanism 50, and has such dimensions that a thickness thereof is slightly smaller than the width of the mount groove 51 (mount groove 51b) and a length thereof is slightly longer than the length of the mount groove 51b. With this arrangement, the temple-side retaining projection 53b is fitted in the mount groove 51b.

The temple-side mount element 54b is also one of the constituent elements of the temple-attachment mechanism 50. The mount element 54b has a circular shape with an outer diameter thereof slightly larger than an inner diameter of the corresponding first through hole 52b and is formed with a second through hole 55 (temple-side second through hole 55b) at a center thereof which has substantially the same inner diameter as the corresponding first through hole 52b.

With this arrangement, similar to the fastening device 56 of the bridge-attachment mechanism 50, a fastening device 56 of the temple-attachment mechanism 50 is operated as follows. Specifically, fittingly inserting the temple-side retaining projection 53b in the mount groove 51b, inserting the cylindrical portion 57a of the nut 57 into the first through hole 52b in the lens 20 from the backside of the lens 20 and in the second through hole 55b of the mount element 54b, and screwing the main body 58a of the screw 58 into the threaded hole of the cylindrical portion 57a of the nut 57 enables to securely attach the temple 40 to the lens 20, as shown in FIG. 4B.

Figure 5A:
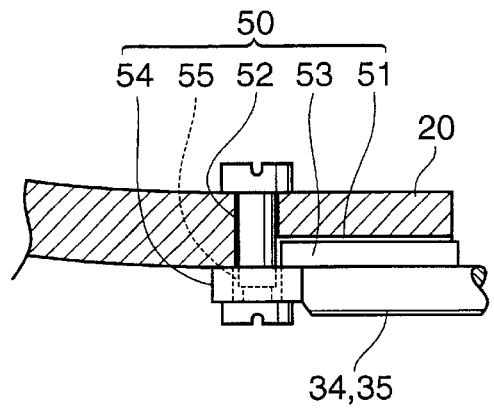
Figure 5B:
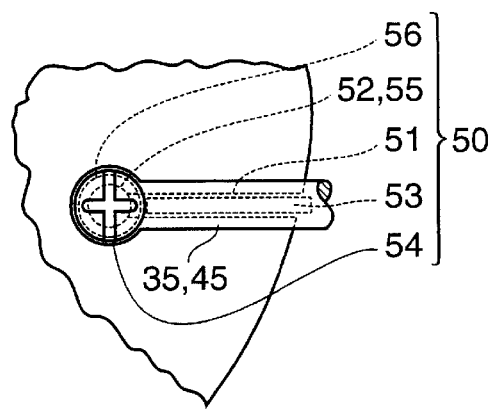
Figure 5C:
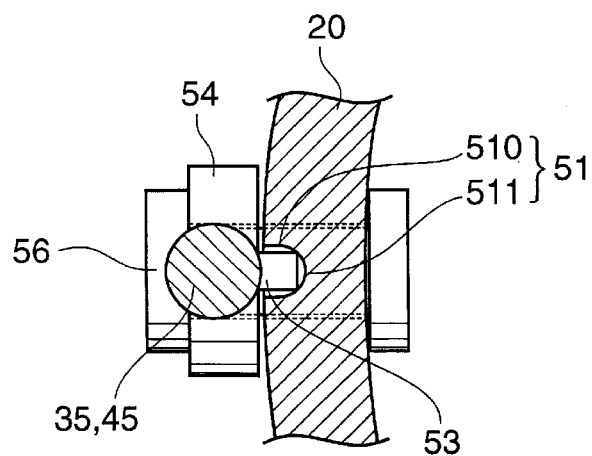
Figure 6A:
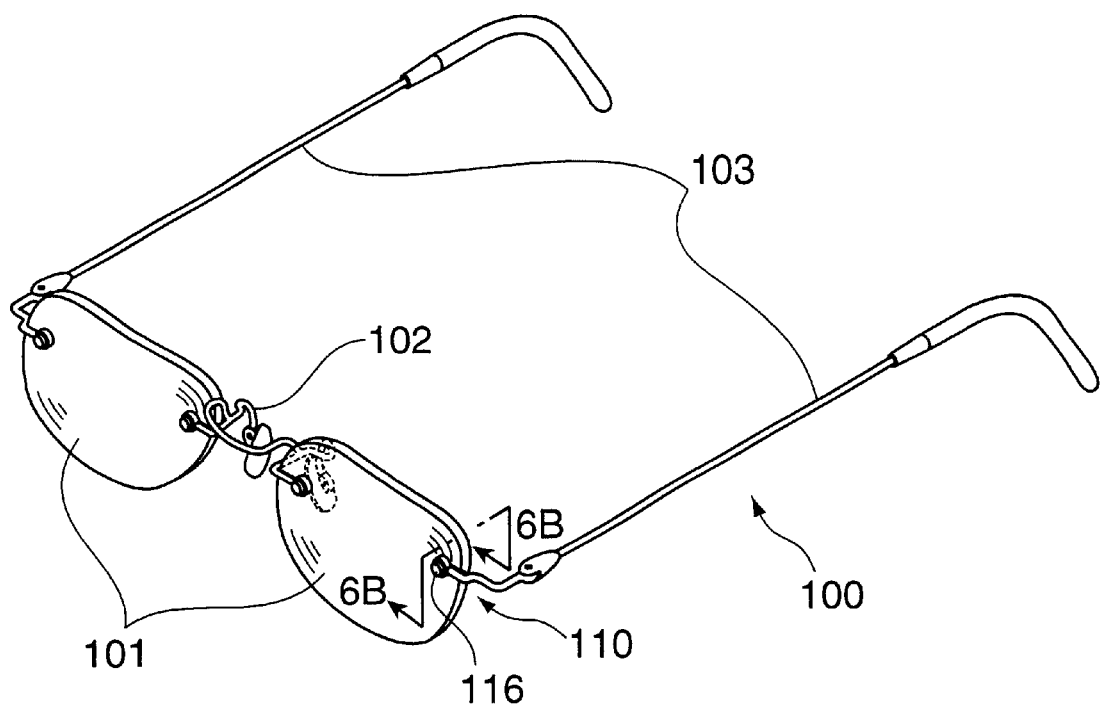
Figure 6B:
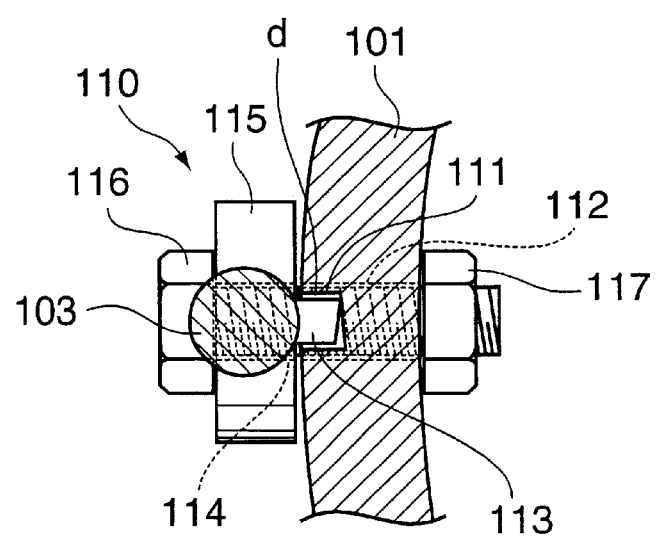

The attachment mechanism 50 has been described part by part according to needs. Hereafter, the entire arrangement of the attachment mechanism 50 is described. FIGS. 5A to 5C are diagrams illustrating an embodiment of the attachment mechanism 50. FIG. 6A is a plan view in section, FIG. 5B is a front view, and FIG. 5C is a side view in section.

As shown in FIGS. 5A and 5B, the bridge-attachment mechanism (temple-attachment mechanism) comprises the mount groove 51 formed in each of a side end portion of the lens 20 extending sidewise, the first through hole 52 formed at the base end (left side in FIG. 5A) of the mount groove 51, the retaining projection 53 formed at the bridge 30 (temple 40) to be fittable in the mount groove 51, the mount element 54 attached to the lead end of the retaining projection 53 in which the second through hole 55 is formed in the center having such dimensions as to match with the first through hole 52, and the fastening device 56 which fastens the lens 20 and the bridge 30 (or the temple 40) by fastening the screw 58 into the nut 57 by way of the first through hole 52 and the second through hole 55.

Each of the constituent elements of the attachment mechanism 50 (namely, mount groove 51, first through hole 52, retaining projection 53, mount element 54, second through hole 55, and fastening device 56) has been described above. The most significant feature of the attachment mechanism 50 of the invention, however, is that the mount groove 51 has a tapered shape including an arc portion viewed in section, as shown in FIG. 5C.

Specifically, as shown in FIG. 5C, the mount groove 51 includes a parallel portion 510 formed in the vicinity of an opening thereof in such a manner that opposing walls thereof extend horizontally in parallel to each other, and an arc portion 511 formed at a bottom end of the mount groove 51 which is continued from the parallel portion 510. The parallel portion 510 has a depth smaller than a length of the retaining projection 53 having a rectangular shape in section. The arc portion 511 is continued from the opposing walls of the parallel portion 510 and is formed into an arc shape. In other words, the bottom wall of the mount groove 51 is configured into an arc shape in section taken along a direction orthogonal to the extending direction of the mount groove 51.

The mount groove 51 having the above construction is easily formed by filing or its equivalent, specifically by fitting a rattail in a clearance defined by two-legged portions of a known guide jig while guiding along the opposing walls of the legged portions, and reciprocating the jig while pressing the rattail against the surface of the lens 20 at the position where the groove 51 is to be formed.

According to the above configuration of the mount groove 51, fittingly inserting the retaining projection 53 into the mount groove 51 and fastening the screw 58 into the second through hole 55 of the mount element 54 and in the first through hole 52 formed in the lens 20 enables to bring upper and lower corner portions at a lead end of the retaining projection 53 in pressing contact with the surface of the arc portion 511 of the mount groove 51 (i.e., bring the retaining projection 53 into opposite-parallel contact state with the mount groove 51). Thereby, prevented is an undesirable displacement of the retaining projection 53 in the extending direction of the mount groove 51.

With this arrangement, even if there is a clearance between the retaining projection 53 and the opposing walls of the parallel portion 510 of the mount groove 51, there is prevented a likelihood that the attachment portions 35, 45 may be displaced relative to the lens 20, which effectively prevents undesirable displacement of the bridge 30 and the temple 40 to the lens 20.

As described above, an inventive eyewireless glasses 10 has the construction that the bridge 30 is directly mounted between the pair of lenses 20, 20 and the temples 40, 40 are directly attached to the lenses 20, 20 via the attachment mechanisms 50 which respectively attaches the bridge 30 and the lens 20 (20) and the temple 40 (40) and the lens 20 (20). The attachment mechanism 50 includes the mount grooves 51 each of which is formed in the side end portion of the lens 20 and extends in a width direction of the lens 20, the first through hole 52 which is formed in the base end of the mount groove 51, the retaining projection 53 which is formed at an end of the bridge 30 (temple 40) to be engageably fitted in the corresponding mount groove 51, the mount element 54 which is attached to the lead end of the retaining projection 53 and is formed with the second through hole 55 in correspondence to the first through hole 52, and the fastening device 56 adapted to fasten the lens 20 to the bridge 30 (temple 40), combined with the arrangement that the bottom wall of the mount groove 51 has an arc shape in section taken along the direction orthogonal to the extending direction thereof.

With this arrangement, when the eyewireless glasses 10 are assembled in such a manner that the retaining projection 53 is securely fitted in the mount groove 51 with the fastening operation of the fastening device 56, the respective lead ends of the retaining projections 53 are abutted against the arc-shaped bottom walls of the mount grooves 51 in opposite-parallel-contact. Thus, even if there is a clearance between the retaining projection 53 and the opposing walls of the mount groove 51, there can be prevented a likelihood that the retaining projection 53 is displaced relative to the mount groove 51 within the clearance. Thus, securely prevented is a drawback that the temple 40 and/or the bridge 30 may be displaced relative to the lens 20.

Thus, compared to the conventional glasses having a problem that the commercial value thereof may be lowered by impairing its high-quality appearance due to undesirable swaying displacement of the temple and/or the bridge to the lens, the arrangement of the inventive glasses eliminates such a drawback, thus enabling to provide glasses of high-quality.

Further, since the mount grooves 51 are formed in the frontal surface of the lens 20 (20), when the temples 40, 40 are folded to the lenses 20, 20 at a substantially right angle, the temple 40 (40) is attached to the lens 20 (20) in a state that the folded part of the temple 40 (40) appears on the frontal side of the lens 20 (20) with the opposite ends of the bridge 30 appearing on the frontal side of the lenses 20, 20. This provides good appearance for the glasses.

Furthermore, the fastening device 56 comprises the nut 57 which includes a head portion at an end thereof and has a length sufficient to be inserted in the first through hole 52 and the second through hole 55, and a screw 58 which is screwed into the nut 57. This arrangement enables to render the entire outer circumference of the nut 57 into fitting contact with the inner circumferences of the first through hole 52 and the second through hole 55. Thus, compared to a case where a screw is inserted in through holes corresponding to the first and second through holes 52, 55, the contact surface between the outer circumference of the nut 57 and the inner circumference of the first through hole 52 (second through holes 55) is larger. As a result, the joint state of the temple 40 (bridge 30) to the lens 20 is more stabilized.

This invention is not limited to the foregoing embodiment, and the following modifications and alterations can be applicable.

(1) In the embodiment, both the bridge 30 and the temple 40 are attached to the lens 20 via the corresponding attachment mechanism 50 of the invention. Alternatively, either one of the bridge 30 and the temple 40 may be attached to the lens 20 via the attachment mechanism 50.

(2) In the embodiment, the mount groove 51 comprises the parallel portion 510 and the arc portion 511. As an altered form, the mount groove 51 may include the arc portion 511 only.

(3) In the embodiment, the mount groove 51 has a substantially tapered shape including the arc portion 511. Alternatively, the mount groove 51 may be shaped into a tapered configuration which is defined by opposing straight slopes.

As described above, an inventive eyewireless glasses comprises a frame member which support a glass, and an attachment mechanism including a mount groove formed in an end portion of the glass, a lower portion of the mount groove being defined by a converging wall, a mount element provided at an end of the frame member, a fastening device which fastens the frame member on the glass by way of the mount element, and a retaining projection formed on the frame member near the mount element, the retaining projection having a leading end which comes into contact with the converging wall of the mount groove at least two or more points when the frame member is fasten on the glass by the fastening device.

With the above-mentioned construction, the leading end of the retaining member comes into contact with the converging wall of the mount groove at least two or more points when the frame member is fasten on the glass by the fastening device. Accordingly, the frame is securely attached on the glass without displacement of the frame member with respect to the glass.

The retaining projection may be preferably formed along an extension of the frame member. The retaining projection which is formed along an extension of the frame member makes the attachment of the frame member more secure.

The leading end of the retaining projection may be preferably made to come into contact with the converging wall of the mount groove along the opposite parallel lines. The opposite parallel contacts can prevent the frame member from moving in a simpler way.

The leading end of the retaining projection may preferably have a rectangular shape. It may be preferable to define the lower portion of the mount groove by a circular wall. This will assure easier shaping of the leading end of the retaining projection.

This application is based on patent application No. 2001-133974 filed in Japan, the contents of which are hereby incorporated by references.

As this invention may be embodied in several forms without departing from the spirit of essential characteristics thereof, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A pair of glasses comprising:
   a frame member which supports a glass having a front surface and a rear surface opposite to the front surface;
   a through hole formed in an end portion of the glass, and extending from the front surface to the rear surface of the glass;
   a mount groove formed in one of the front and rear surfaces of the glass, and extending from the through hole to an end edge of the glass, a lower portion of the mount groove being defined by a converging wall;
   a mount element provided at an end of the frame member, and having a through hole arranged coaxially with the through hole of the glass;
   a fastening device having a fastening bolt provided with a threaded shaft portion passing through the through hole of the glass and through the through hole of the mount element and a nut engaging with the threaded shaft; and
   a retaining projection formed on the frame member and extending along the mount groove from near the mount element, the retaining projection having a leading end which comes into contact with the converging wall of the mount groove at at least two points when the frame member is fastened on the glass by the fastening device.

2. A pair of glasses according to claim 1, wherein the leading end of the retaining projection comes into contact with the converging wall of the mount groove along two substantially parallel lines of contact.

3. A pair of glasses according to claim 2, wherein the leading end of the retaining projection has a rectangular shape.

4. A pair of glasses according to claim 3, wherein the lower portion of the mount groove is defined by a circular wall.

5. A pair of glasses according to claim 1, wherein the leading end of the retaining projection has a rectangular shape.

6. A pair of glasses according to claim 1, wherein the lower portion of the mount groove is defined by a circular wall.

7. A pair of glasses comprising:
   a glass having a front surface, a rear surface opposite to the front surface and an edge extending between the front and rear surfaces, a through hole formed in the glass at a location spaced from the edge and extending from the front surface to the rear surface of the glass, a mount groove formed in one of the front and rear surfaces of the glass and extending from the through hole in the glass to the edge of the glass, a lower portion of the mount groove being defined by converging surface areas;
   a frame member with a mount element provided at an end of the frame member, the mount element having a through hole arranged coaxially with the through hole in the glass, a retaining projection formed on the frame member and extending along the mount groove from a location near the mount element, the retaining projection having a leading end which contacts the converging surface areas of the mount groove at at least two locations; and
   a fastening device having a fastening bolt provided with a threaded shaft passing through the through hole of the glass and through the through hole of the mount element and a nut engaging with the threaded shaft, the fastening device being aligned relative to the glass for urging the retaining projection securely against the converging surface areas of the mount groove.

8. The pair of glasses of claim 7, wherein the leading end of the retaining projection is configured for contacting the converging surface areas of the mount groove along two substantially parallel lines of contact that are spaced from one another, the retaining projection being spaced from the converging surface areas of the mount groove at locations spaced from the lines of contact.

9. The pair of glasses of claim 8, wherein the lines of contact are aligned at an angle to the threaded shaft of the fastening device.

10. The pair of glasses of claim 7, the retaining projection is an elongate projection extending at an angle to the fastening bolt of the fastening device.

11. The pair of glasses of claim 10, wherein the leading end of a retaining projection has a rectangular shape.

12. The pair of glasses of claim 11, wherein the rectangular shape of the retaining projection is defined by surfaces aligned at an angle to the threaded shaft of the fastening bolt.

13. The pair of glasses of claim 12, wherein the lower portion of the mount groove is of circular cross-section.

* * * * *